US010812500B2

(12) United States Patent
Rao et al.

(10) Patent No.: US 10,812,500 B2
(45) Date of Patent: Oct. 20, 2020

(54) METHOD OF CYBERTHREAT DETECTION BY LEARNING FIRST-ORDER RULES ON LARGE-SCALE SOCIAL MEDIA

(71) Applicant: GOVERNMENT OF THE UNITED STATES AS REPRESENTED BY THE SECRETARY OF THE AIR FORCE, Rome, NY (US)

(72) Inventors: Praveen Rao, New Hartford, NY (US); Charles Kamhoua, Baltimore, MD (US); Kevin Kwiat, Sarasota, FL (US); Laurent Njilla, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 149 days.

(21) Appl. No.: 15/883,792

(22) Filed: Jan. 30, 2018

(65) Prior Publication Data

US 2019/0238564 A1    Aug. 1, 2019

(51) Int. Cl.
| H04L 29/06 | (2006.01) |
| G06F 17/00 | (2019.01) |
| G06F 16/13 | (2019.01) |
| G06F 16/182 | (2019.01) |
| G06F 16/901 | (2019.01) |
| H04W 4/21 | (2018.01) |

(52) U.S. Cl.
CPC .......... H04L 63/1416 (2013.01); G06F 16/13 (2019.01); G06F 16/183 (2019.01); G06F 16/9024 (2019.01); H04L 63/1425 (2013.01); H04L 63/20 (2013.01); H04W 4/21 (2018.02)

(58) Field of Classification Search
CPC .... H04L 63/1416; H04W 4/21; G06F 16/183; G06F 16/13
USPC .......................................................... 726/1
See application file for complete search history.

(56) References Cited

U.S. PATENT DOCUMENTS

| 6,169,989 | B1 * | 1/2001 | Eichstaedt | G06Q 30/0283 |
| 9,516,053 | B1 * | 12/2016 | Muddu | G06F 16/285 |
| 10,419,466 | B2 * | 9/2019 | Ferguson | H04L 63/1425 |
| 2008/0168529 | A1 * | 7/2008 | Anderson | G06F 21/577 |
| | | | | 726/1 |
| 2009/0292549 | A1 * | 11/2009 | Ma | G06K 9/00335 |
| | | | | 705/319 |

(Continued)

OTHER PUBLICATIONS

Ke Tang; Insider Cyber Threat Situational Awareness Framwork using Dynamic Bayesian Networks; IEEE: 2009; p. 1146-1150.*

(Continued)

*Primary Examiner* — Monjur Rahim
(74) *Attorney, Agent, or Firm* — Adam Pugh

(57) ABSTRACT

A cyberthreat detection method and system includes a distributed file system and a commodity cluster. The commodity cluster has a plurality of servers. A data array of key-value pairs related to social media is received; it stores a plurality of predetermined ground predicates. A ground predicate graph is constructed for each user then partitioned into balanced portions $P_i$ each corresponding to a server and the ground predicates stored on that server. In parallel on each server, a plurality of leaned rules are determined for the files stored on that server. From a union of the plurality of learned rules, the system determines a respective weight for each of the learned rules. The plurality of rules are ranked in order of accuracy by the plurality of weights.

20 Claims, 15 Drawing Sheets

(56) References Cited

U.S. PATENT DOCUMENTS

| | | | | |
|---|---|---|---|---|
| 2010/0211533 | A1* | 8/2010 | Yang | G06N 20/00 706/12 |
| 2014/0297652 | A1* | 10/2014 | Stevens | H04L 43/06 707/741 |
| 2015/0248476 | A1* | 9/2015 | Weissinger | G06F 16/35 707/737 |
| 2016/0117602 | A1* | 4/2016 | Hassanzadeh | G06F 16/285 706/11 |
| 2017/0168751 | A1* | 6/2017 | Stevens | G06F 3/0604 |
| 2017/0251012 | A1* | 8/2017 | Stockdale | H04L 63/1441 |
| 2018/0004751 | A1* | 1/2018 | Vikhe | G06F 16/24578 |

OTHER PUBLICATIONS

Schloegel et al., "Parallel Static and Dynamic Multi-Constraint Graph Partitioning", Concurrency and Computation: Practice and Experience, Concurrency Computat.: Pract. Exper., vol. 14: 219-240, DOI: 10.1002/cpe.605, Year 2002 (22 Pages).

Dean et al., "MapReduce: Simplified Data Processing on Large Clusters", In Proc. of the 6th Symposium on Operating Systems Design and Implementation, San Francisco, CA, 2004 (13 Pages).

Meyerhenke et al., "Parallel Graph Partitioning for Complex Networks", IEEE Transactions on Parallel and Distributed Systems (TPDS), Jan. 26, 2015 (12 Pages).

Rao et al., "Probabilistic Inference on Twitter Data to Discover Suspicious Users and Malicious Content", Proc. of the 2nd IEEE International Symposium on Security and Privacy in Social Networks and Big Data (SocialSec 2016), co-located with the 16th IEEE International Conference on Computer and Information Technology (CIT 2016), Nadi, Fiji, 2016, http://doi.org/10.1109/CIT.2016.29 (pp. 407-414).

Rao et al., "Methods to Detect Cyberthreats on Twitter", Surveillance in Action—Technologies for Civilian, Military, and Cyber Surveillance, Advanced Sciences and Technologies for Security Applications, Springer, 2017 (16 Pages).

* cited by examiner

| 301 | Ground Predicates |
|---|---|
| | tweeted(u, t1) |
| | tweeted(u, t2) |
| | containsLink(t1, l1) |
| | containsLink(t2, l2) |
| | mentions(t1, u') |
| | mentions(t2, u') |
| | retweeted(u, t') |
| | containsHashtag(t1, h1) |
| | containsHashtag(t2, h2) |
| | verified(u) |
| | malicious(l1) |
| | malicious(l2) |
| | trending(h1) |
| | trending(h2) |
| | isPossiblySensitive(t1) |
| | isPossiblySensitive(t2) |
| | friendsCount(u, c) |
| | followersCount(u, c) |
| | statusesCount(u, c) |
| | retweetCount(t1, c) |
| | retweetCount(t2, c) |
| | favouritesCount(u, c) |

| | Condition | Edge(u, u') |
|---|---|---|
| 306 | tweeted(u, t) ∧ mentions(t, u') | TRUE |
| 307 | tweeted(u', t') ∧ mentions(t', u) | TRUE |
| 308 | friend(u, u') | TRUE |
| 309 | friend(u', u) | TRUE |
| 310 | isFollowedBy(u, u') | TRUE |
| 311 | isFollowedBy(u', u) | TRUE |
| 312 | tweeted(u, t) ∧ retweeted(u', t) | TRUE |
| 313 | tweeted(u', t) ∧ retweeted(u, t) | TRUE |

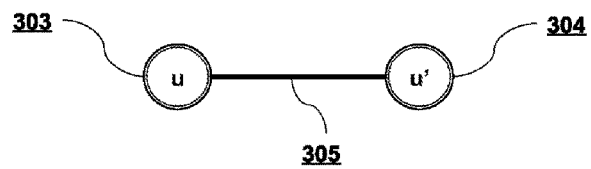

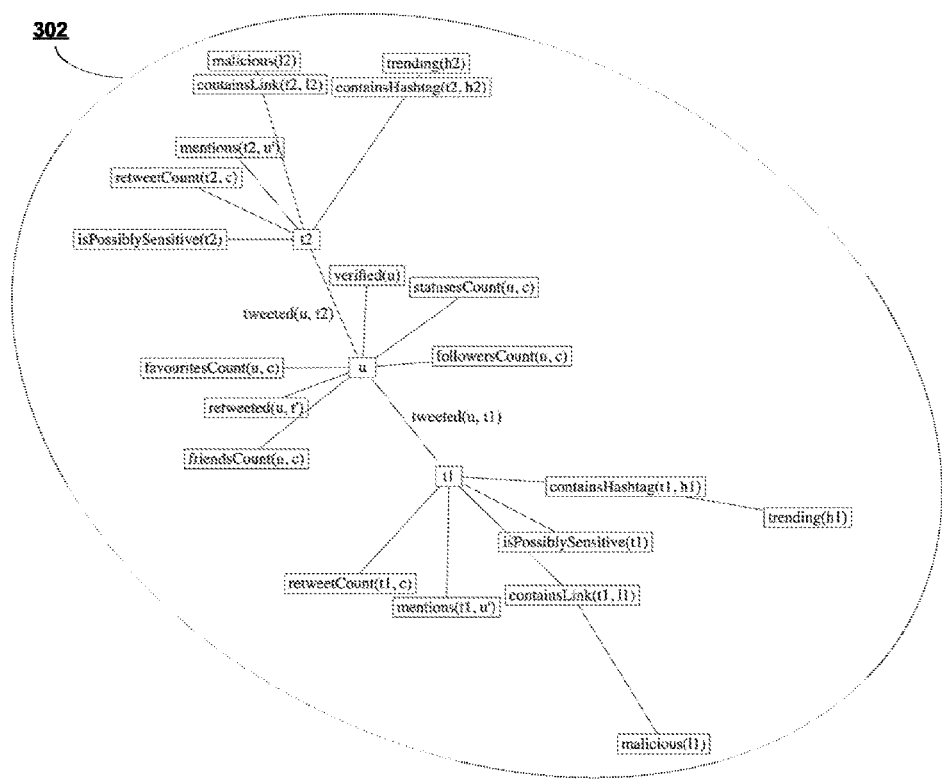

| | Learned formula |
|---|---|
| 1401 | !verified(u) V !attacker(u) |
| 1402 | !containsLink(t,link) V !isPossiblySensitive(t) V malicious(link) |

FIG. 15

| | Formula | Learned weight |
|---|---|---|
| 1501 | !verified(u) V !attacker(u) | 3.5 |
| 1502 | !containsLink(t,link) V !isPossiblySensitive(t) V malicious(link) | -2.5 |

METHOD OF CYBERTHREAT DETECTION BY LEARNING FIRST-ORDER RULES ON LARGE-SCALE SOCIAL MEDIA

GOVERNMENT INTEREST

The invention described herein may be manufactured and used by or for the Government of the United States for all governmental purposes without the payment of any royalty.

FIELD OF THE INVENTION

The present invention relates to systems and methods for protecting against a cyberthreat on large scale social media. The field relates to an application of first order logic, probability theory, and graph theory in implementing a method. In particular, the field relates to methods to learn first-order rules on large-scale Twitter® data using a commodity cluster.

BACKGROUND

Twitter® is a microblogging service where users can instantaneously communicate with others by publicly posting short text messages of up to 140 or 280 characters, for example. Twitter® has been widely used for political campaigns, marketing and advertising, sharing breaking news, and communication during catastrophic events like earthquakes and tsunamis.

Social media websites like Twitter® have been exploited by criminals and saboteurs through cyberattacks against account users and their organizations. Hackers have taken control of government accounts and have posted false information from popular accounts. The damage inflicted by hackers and wrongdoers is oftentimes exacerbated when false postings are reproduced on a large scale. Furthermore, malware may be spread through social media posts when an unsuspecting user is duped into clicking a malicious link presented thereon.

These threats are not only socially damaging, but economically damaging as well. Thus, protecting users and systems against cyberthreats on social media has become a critical aspect of enterprise security management.

However, there are technical challenges that arise in designing a suitable method or system that can model and reason about the veracity of social media posts. One challenge is to represent the complex and diverse social media data in a principled manner. For example, a tweet is a 140-character message posted by users on Twitter®. It is represented using 100+ attributes, and attribute values can be missing and noisy. New attributes may appear in tweets; some attributes may not appear in a tweet. Hashtags, which begin with the # symbol, are used frequently by users in tweets to indicate specific topics or categories. There are thousands of hashtags in use today; the popularity of a hashtag changes over time. Some hashtags may become trending/popular during a particular time period. Another challenge is to construct a knowledge base (KB) on social media posts. The goal is to learn the entities, facts, and rules from a large number of posts. Another challenge is to reason about the veracity of the posts using the KB containing a large number of entities and facts. Thus, suspicious content/activities can be flagged as soon as possible to discover emerging cyber threats.

Ascertaining the veracity (or trustworthiness) of social media posts is becoming very important today. For this, one must consider both the content as well as users' behavior. Patent application Ser. No. 15/585,397, filed May 3, 2017, which names the same inventive entity as this application, the contents of which are hereby incorporated by reference in their entirety, disclosed a method to model and reason about the veracity of tweets to discover suspicious users and malicious content on Twitter®. This earlier method used the concept of Markov logic networks (MLNs) for knowledge representation and reasoning under uncertainty. It was developed to analyze both the behavior of users and the nature of their posts to ultimately discover potential cyberattacks on Twitter®. The earlier system embodies a knowledge base (KB) over tweets to capture both the behavior of users and the nature of their posts. The KB is defined by a set of first-order logic rules/formulas along with weights. Using probabilistic inference on the KB, the earlier method identified malicious content and suspicious users on a given collection of tweets. In this method, the rules in the KB were handcrafted prior to system execution. However, malicious users on Twitter® may continue to evade being detected by changing the way in which they pose cyber threats on Twitter®. Thus, as the number of tweets being analyzed in the KB becomes very large, interesting new rules may appear and disappear and change over time. Consequently, a new solution set forth in this application is directed to a system that automatically learns the structure of the KB, i.e., the first-order rules (also referred to as formulas) so as to more accurately predict and identify misinformation potentially indicative of cyberthreats.

SUMMARY OF THE INVENTION

With the above in mind, an embodiment of the present invention is related to a cyberthreat detection system comprising a distributed file system and a commodity cluster configured in data communication via a network, wherein the commodity cluster is defined as a plurality m of servers, each including a computer processor and a non-transitory computer-readable storage medium comprising a plurality of instructions which, when executed by the computer processor, perform a method.

The method includes receiving a data array characterized by a key and a value in a set of pairs relating to social media posts and users, storing a plurality of predetermined ground predicates, constructing a ground predicate graph for each user reflected in the array, constructing a user centric graph having one or more vertices and one or more edges and wherein each vertex represents the ground predicate graph corresponding to each user. The method includes partitioning the user centric graph into balanced portions $P_i$ corresponding to the number of servers and wherein the ground predicates of each vertex in partition $P_i$ are stored as a file on a server associated with that partition $P_i$, and determining a plurality of learned rules, in parallel on each server, on the files stored on each server. The method also includes receiving a union of the plurality of learned rules and determining a respective weight for each of the plurality of learned rules of the union. In addition, the processor ranks the plurality of rules of the union by the plurality of weights.

The system may be further defined by variables in the predetermined ground predicates comprising one or more of the following types: (i) "tweetID" to denote the ID of a tweet (ii) "userID" to denote the ID of a user (iii) "link" to denote a URL (iv) "hashtag" to denote a word prefixed by the '#' symbol and (v) "count" to denote a non-negative integer.

The system may be further defined by having the data array split into separate data blocks and wherein constructing the user centric graph comprises performing a map operation in parallel on each block, and shuffling and sorting the data output from the map operations. The system may also include a processor configured to perform a reduce operation in parallel for each block of data shuffled and sorted, and storing the data output from the reduce operation in a file.

The system may be further defined by having the file comprise a Hadoop Distributed File System file. In addition, the system may be further include defining an edge defined between a first and a second user in the user centric graph if any of the following conditions are satisfied: a tweet of the first user mentions the second user; a tweet of the second user mentions the first user; the first user is a friend of the second user; the second user is a friend of the first user; the first user is followed by the second user; the second user is followed by the first user; a tweet of the first user was retweeted by the second user; or a tweet of the second user was retweeted by the first user.

The system may further include ranking the plurality of rules of the union by determining a respective partial product of the weights for each of the plurality of learned rules of the union and summing the plurality of partial products to define a total weight.

Another embodiment of the invention may include a computer-implemented method of cyberthreat detection, whereby the method involves receiving, using each of a plurality m of servers, a plurality of first-order predicates. The method includes receiving, using a distributed file system, a plurality of ground predicates associated with the first-order predicates and each characterized by a key and a value. The method includes receiving a data array characterized by a key and a value in a set of pairs relating to social media posts and users, and storing the plurality of ground predicates. The method includes constructing a ground predicate graph for each user reflected in the array, and constructing a user centric graph having one or more vertices and one or more edges and wherein each vertex represents the ground predicate graph corresponding to each user. The method includes partitioning the user centric graph into balanced portions Pi corresponding to the number of servers and wherein the ground predicates of each vertex in partition Pi are stored as a file on a server associated with that partition Pi. The method includes determining a plurality of learned rules, in parallel on each server, on the files stored on each server, and receiving a union of the plurality of learned rules, and determining a respective weight for each of the plurality of learned rules of the union. The method includes ranking the plurality of rules of the union by the plurality of weights.

The method may further include selecting the ground predicates to be one or more of the following types: (i) "tweetID" to denote the ID of a tweet (ii) "userID" to denote the ID of a user (iii) "link" to denote a URL (iv) "hashtag" to denote a word prefixed by the '#' symbol and (v) "count" to denote a non-negative integer.

The method may include splitting the data array into separate data blocks and wherein constructing the user centric graph comprises performing a map operation in parallel on each block, and shuffling and sorting the data output from the map operations. The method may also include a performing a reduce operation in parallel for each block of data shuffled and sorted, and storing the data output from the reduce operation in a file.

The method may be further defined by providing a file comprising a Hadoop Distributed File System file. The method may further include splitting the data into key-value pairs, performing a second map operation in parallel in order to output weights, shuffling and sorting the output weights from the second map operation, performing a second reduce operation in parallel on the output weights to produce the user centric graph, and storing the user centric graph in the file.

The method may further include defining an edge between a first and a second user in the user centric graph if any of the following conditions are satisfied: a tweet of the first user mentions the second user; a tweet of the second user mentions the first user; the first user is a friend of the second user; the second user is a friend of the first user; the first user is followed by the second user; the second user is followed by the first user; a tweet of the first user was retweeted by the second user; or a tweet of the second user was retweeted by the first user.

The method may further include ranking the plurality of rules of the union by determining a respective partial product of the weights for each of the plurality of learned rules of the union and summing the plurality of partial products to define a total weight.

Another embodiment of the invention may include a system for detecting suspicious activity on social media comprising a distributed file system and a commodity cluster configured in data communication via a network, wherein the commodity cluster is defined as a plurality m of servers, each server includes a computer processor and a non-transitory computer-readable storage medium, a data array characterized by a key and a value in a set of pairs relating to social media posts and users, and wherein the processor is configured to store a plurality of predetermined ground predicates. The system includes the processor being configured to construct a ground predicate graph for each user reflected in the array, and wherein the processor is configured to construct a user centric graph having one or more vertices and one or more edges and wherein each vertex represents the ground predicate graph corresponding to each user. The system includes the processor being configured to partition the user centric graph into balanced portions Pi corresponding to the number of servers and store the ground predicates of each vertex in partition Pi as a file on a server associated with that partition Pi, and wherein the processor is configured to determine a plurality of learned rules, in parallel on each server, on the files stored on each server. The system includes a processor configured to perform a union operation to generate a union of the plurality of learned rules, and wherein the processor is configured to determine a respective weight for each of the plurality of learned rules of the union. The system includes the processor being configured to rank the plurality of rules of the union by the plurality of weights.

The system may further include the processor being configured to determine the plurality of learned rules by running a Markov logic network learning algorithm.

The system may further include having an edge be defined between a first and a second user in the user centric graph if any of the following conditions are satisfied: a tweet of the first user mentions the second user; a tweet of the second user mentions the first user; the first user is a friend of the second user; the second user is a friend of the first user; the first user is followed by the second user; the second user is followed by the first user; a tweet of the first user was retweeted by the second user; or a tweet of the second user was retweeted by the first user. The system may further the processor being configured to rank the plurality of rules of the union by determining a respective partial product of the weights for each of the plurality of learned rules of the union and summing the plurality of partial products to define a total weight.

BRIEF DESCRIPTION OF THE DRAWINGS

FIG. 3 is a series of data structure relationship graphs and diagrams illustrating ground predicate mapping to a user-centric single vertex with defined edges according to the invention illustrated in FIG. 1.

FIG. 14 illustrates examples of learned formulas resulting from step 1009 in FIG. 10.

FIG. 15 illustrates examples of weights output in step 1012 in FIG. 10 for the learned formulas resulting from step 1009 in FIG. 10.

DETAILED DESCRIPTION OF THE INVENTION

Figure 1:
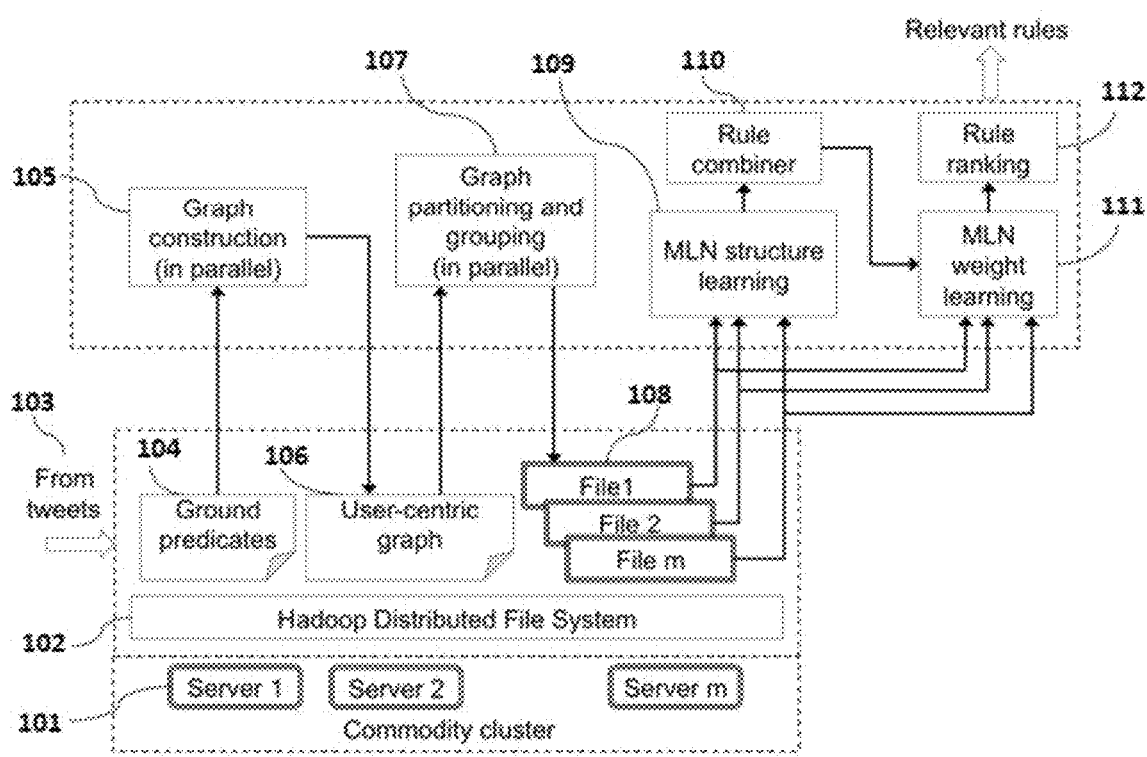
FIG. 1 is a flowchart illustrating an overview of the method of cyberthreat detection on large scale social media according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified. An embodiment of the invention, as shown and described by the various figures and accompanying text, provides for systems and methods of detecting and protecting against a cyberthreat on large scale social media. In particular, a method to learn first-order rules on large-scale Twitter® data using a commodity cluster. However, the embodiments of the invention described herein may be relevant to other social media platforms. Nevertheless, the focus of the present invention is directed toward Twitter® and text posts of up to 140 or 280 characters from Twitter® users, defined as tweets.

As will be described in more detail below, one aspect of this solution comprises a system and method to learn relevant rules in the KB over a large number of tweets using a divide-and-conquer approach in a commodity cluster with multiple servers. This system can be described as an application of first-order logic, probability theory and graph theory principles. In graph theory, a graph comprises a mathematical structure used to model pairwise relations between objects. A graph in this context is represented by vertices (or nodes) that are connected by edges (or lines).

In statistical relational learning, a Markov Logic Network (MLN) is an algorithm or representation that combines first-order logic and probabilistic graphical models. Examples of MLNs are disclosed in M. Richardson and P. Domingos. Markov Logic Networks; Machine Learning, 62(1-2):107-136, Jan. 27, 2006, the contents of which are hereby incorporated by reference in their entirety. Formally, a MLN is a KB defined by a set of pairs (F,w), where F is a first-order formula (or rule) that denotes a constraint and w is a real-valued weight of the formula. A formula with a positive weight is more likely to be satisfied in a possible world. Conversely, a formula with a negative weight is more likely to be unsatisfied (in other words, less likely to be satisfied). The higher the magnitude of the weight, the stronger the formula is as a constraint and thus importance.

A grounding of a formula (or predicate) is obtained by replacing all its variables by constants from a data set. The obtained formula (or predicate) is called a ground formula (or ground predicate). Based on the predicates in the KB, tweets, and external data sources, ground predicates are generated for further processing on this system.

The system described below constructs a user-centric graph on the generated ground predicates in parallel. This graph is a weighted graph with weights on the vertices and edges. It essentially clusters ground predicates pivoted around the social media users, as the goal of the KB is to reason about suspicious users and malicious content on Twitter®. By applying parallel graph partitioning, the user-centric graph is partitioned to organize ground predicates into m partitions to reduce the chance of missing important rules that may span across multiple partitions. Each partition can be processed by a single server in the cluster, and first-order rules are automatically learned on each partition using an existing MLN structure learning technique. The union of the rules from all partitions is computed. In parallel, the weights of all the rules are learned on each partition using an existing MLN weight learning technique. Finally, the method embodies a ranking scheme that objectively combines the learned weights and retains only the most relevant rules in the KB. The parallel graph partitioning and the arrangement of the server cluster achieve a greatly enhanced speed and flexibility for the learning system as compared to prior systems.

Because structured learning on a large number of ground predicates generated from tweets (e.g., 1+ million ground predicates) can be very slow, the current invention employs a divide-and-conquer approach to expedite learning the most relevant rules of a knowledge base (simplified as "KB"). As the main purpose of the KB is to analyze data from Twitter® to detect suspicious users and malicious content, it focuses on users in tweets so that ground predicates can be partitioned among servers appropriately. As depicted, and will be explained in further detail, the rules are learned in parallel with emphasis placed on reducing the chance of missing important rules that may span across several partitions/servers.

Referring to FIG. 1, a flowchart illustrating an overview of the method for protecting against a cyberthreat on social media, such as, for example, Twitter®. As shown, the invention is designed to operate on a commodity cluster with multiple servers 101, with stored data using what is known in the art as a Hadoop Distributed File System (HDFS) 102. One example of such a system is disclosed by K. Shvachko, H. Kuang, S. Radia, and R. Chansler: "The Hadoop Distributed File System," 2010 IEEE 26th Symposium on Mass Storage Systems and Technologies (MSST), May 2010, the contents of which are hereby incorporated by reference in their entirety. The tweets 103 may be processed, and ground predicates 104 may be stored in HDFS. By processing the ground predicates, the invention may perform graph construction in parallel 105 and may output a user-centric graph 106. Each vertex and associated edge of the graph has a weight associated with it. The user-centric graph may be partitioned into m balanced partitions/servers by reducing or minimizing the total weight of the cut edges 107. Furthermore, ground predicates associated with each partition/server may be grouped 107 and then stored in m files 108.

Next, each file containing ground predicates may be processed by an MLN-structure-learning-software on one server 109. The method may combine the rules learned on each partition/server by applying a union operation 110. After that, the method may learn the weight of each rule on each partition/server using what is known in the art as MLN-weight-learning-software 111. Finally, the rules may be combined objectively and ranked 112 to output those rules that are the most relevant.

The divide-and-conquer approach described herein is facilitated by the user-centric graph 106, which serves three purposes: First, a vertex of the graph enables the ground predicates to be grouped in the data based for a specific user; Second, an edge within the graph captures the extent of social relationships between two users based on ground predicates that are true in the data; and Third, by assigning weights to vertices and edges of the graph, the invention can dynamically frame an issue and find an appropriate resolution. It does this in a way to create balanced partitions/servers of ground predicates for structure learning while minimizing the chance of missing relevant rules across partitions. As a result, rule learning time is reduced by operating in parallel on smaller sets of ground predicates rather than operating on a single large set.

Figure 2:
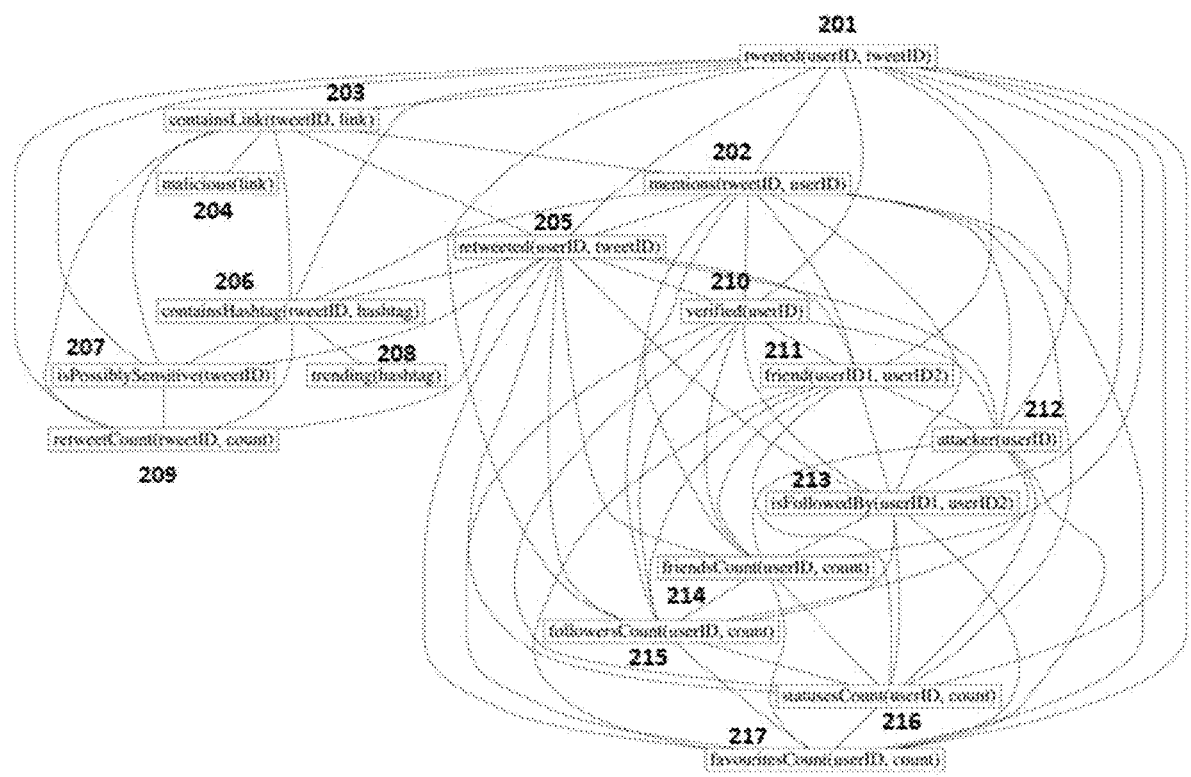
FIG. 2 is a data structure relationship diagram according to the invention illustrated in FIG. 1.

FIG. 2 is a data structure relationship diagram that illustrates the invention's first-order predicates from the Twitter® KB. The vertices in the graph denote the predicates. For example, the predicates used in the present embodiments are: tweeted(userID, tweetID) 201, mentions(tweetID, userID) 202, containsLink(tweetID, link) 203, malicious (link) 204, retweeted(userID, tweetID) 205, containsHashtag(tweetID, hashtag) 206, isPossiblySensitive (tweetID) 207, trending(hashtag) 208, retweetCount (tweetID, count) 209, verified(userID) 210, friend(userID1, userID2) 211, attacker(userID) 212, isFollowedBy(userID1, userID2) 213, friendsCount(userID, count) 214, followersCount(userID, count) 215, statusesCount(userID, count) 216, and favouritesCount(userID, count) 217.

The variables in the predicates are of the following types (i) "tweetID" to denote the ID of a tweet (ii) "userID" to denote the ID of a user (iii) "link" to denote a URL (iv) "hashtag" to denote a word prefixed by the '#' symbol and (v) "count" to denote a non-negative integer.

An edge, shown by a curved line, located between two predicates indicates that they can appear in a first-order rule. Given the dense nature of the graph, it is evident that a large number of candidate rules may be tested to extract the most relevant rules from a set of ground predicates. A ground predicate may be obtained by replacing the variables in a predicate by constants from the data.

FIG. 3 illustrates a plurality of ground predicates associated with a user u 301. To construct the user-centric graph, the approach first constructs a ground-predicate graph for each user. This is done using all the ground predicates associated with that user. The ground-predicate graph for u 302 shows all the 22 ground predicates in the example as a graph, where some predicates are represented as edge labels for convenience. This ground-predicate graph is then represented by a single vertex in the user-centric graph 303.

When defining an edge, two vertices are used if certain conditions are met. For example, u 303 and u' 304 in the user-centric graph is demonstrative. An edge may be defined between them 305 if and only if any of the following conditions is satisfied: (1) a tweet of u mentions u' 306; (2) a tweet of u' mentions u 307; (3) u is a friend of u' 308; (4) u' is a friend of u 309; (5) u is followed by u' 310; (6) u' is followed by u 311; (7) a tweet of u was retweeted by u' 312; or (8) a tweet of u' was retweeted by u 313.

Figure 4:
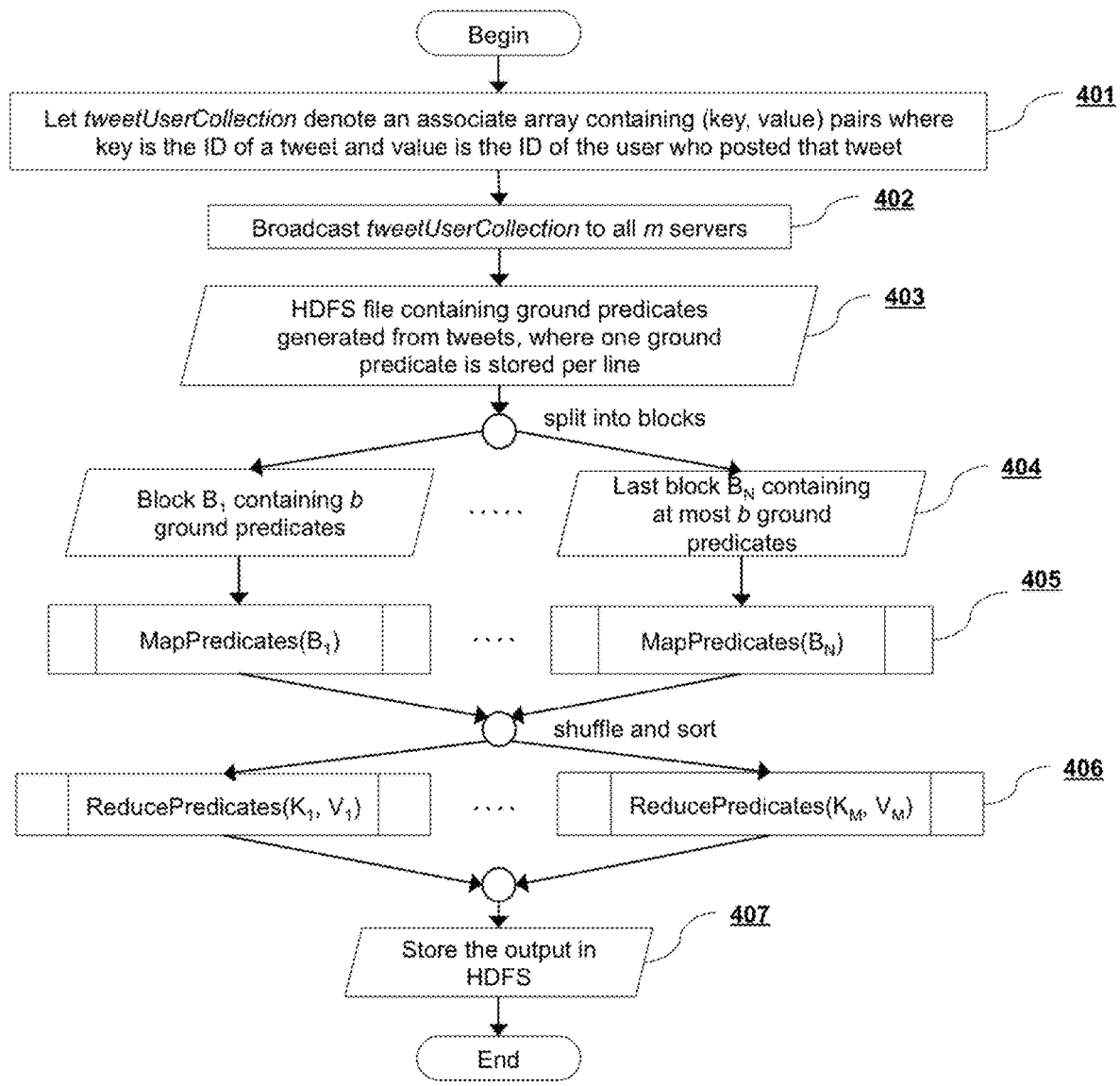
FIG. 4 is a flowchart illustrating ground predicates being grouped by user ID in parallel according to the invention illustrated in FIG. 1.

FIG. 4 illustrates the initial steps taken by the approach to process the ground predicates and group them by user ID. This facilitates the generation of the user-centric graph and uses data parallelism via the MapReduce paradigm. The MapReduce paradigm is disclosed in J. Dean and S. Ghemawat, MapReduce: Simplified Data Processing on Large Clusters; Proc. of the 6th Symposium on Operating Systems Design and Implementation (OSDI), pages 1-10, San Francisco, Calif., December 2004, the contents of which are hereby incorporated by reference in their entirety. The MapReduce paradigm refers to a parallel approach of splitting the input data into independent chunks, then applying map operations on the chunks in parallel, followed by grouping of intermediate key-value pairs (generated by the map operations) by key, and finally applying reduce operations in parallel on each group of key-value pairs with the same key. As illustrated, an associative array tweetUserCollection is generated by processing the predicates of the type tweeted(.) 401. The array comprises data (key, value) pairs. In one example, key is the ID of a tweet and value is the ID of the user who posted that tweet. This array is broadcast to all servers 1-*m* in the cluster at 402.

The input data contains ground predicates generated from tweets where one ground predicate is stored one per line in HDFS at 403. The input data is split into blocks each containing b lines, with the exception of the last block containing less than b lines 404. On each block, the map operation is performed by invoking the subroutine MapPredicates 405, which can operate in parallel. The output data from all the map operations are shuffled and sorted as in MapReduce. The reduce operations are performed in parallel by invoking the subroutine ReducePredicates 406. The output data from the reduce operations are stored in HDFS 407.

Figure 5A:
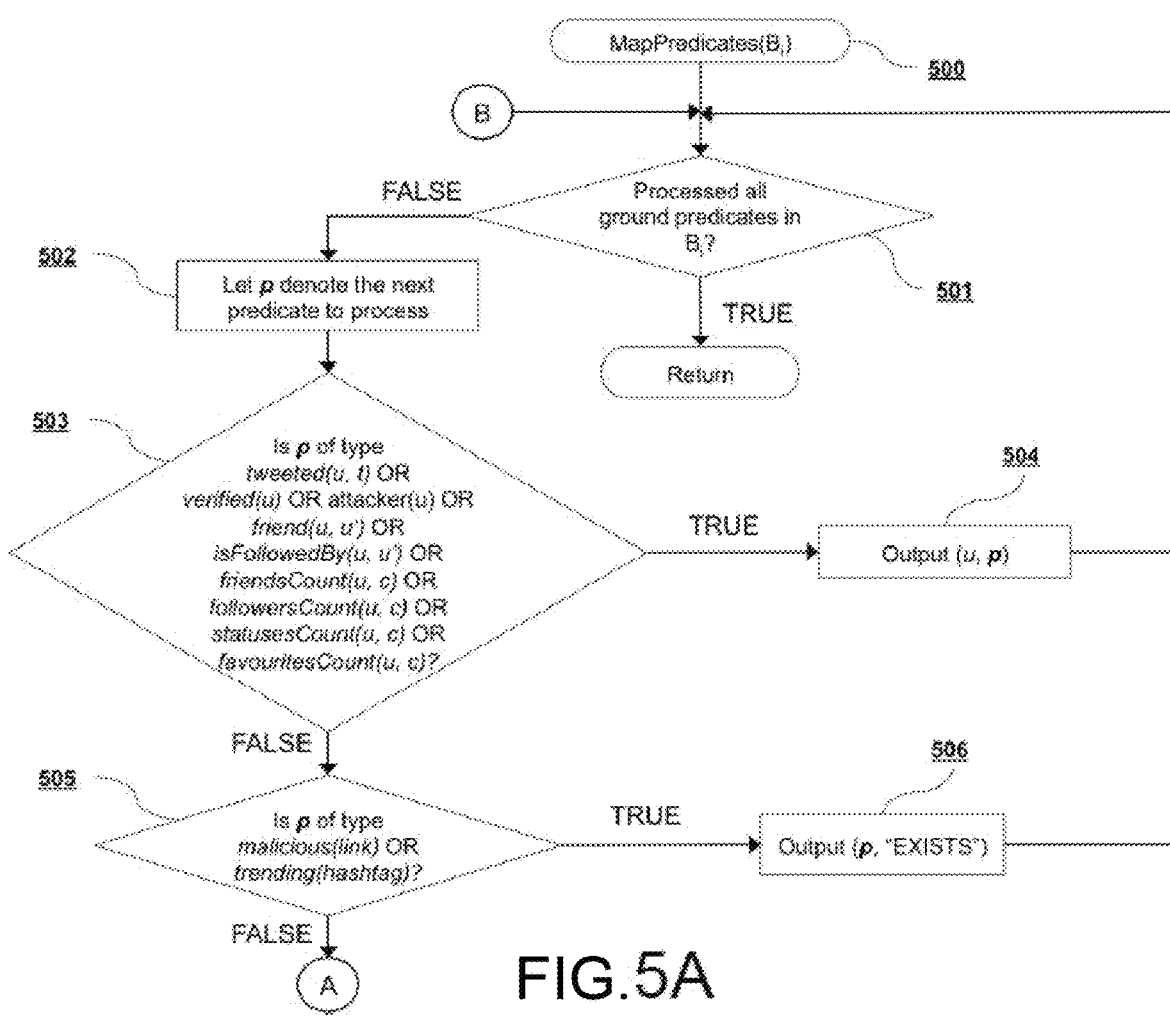
FIGS. 5A and 5B are a flowchart illustrating mapping of ground predicates by user ID according to the invention illustrated in FIG. 1.
Figure 5B:
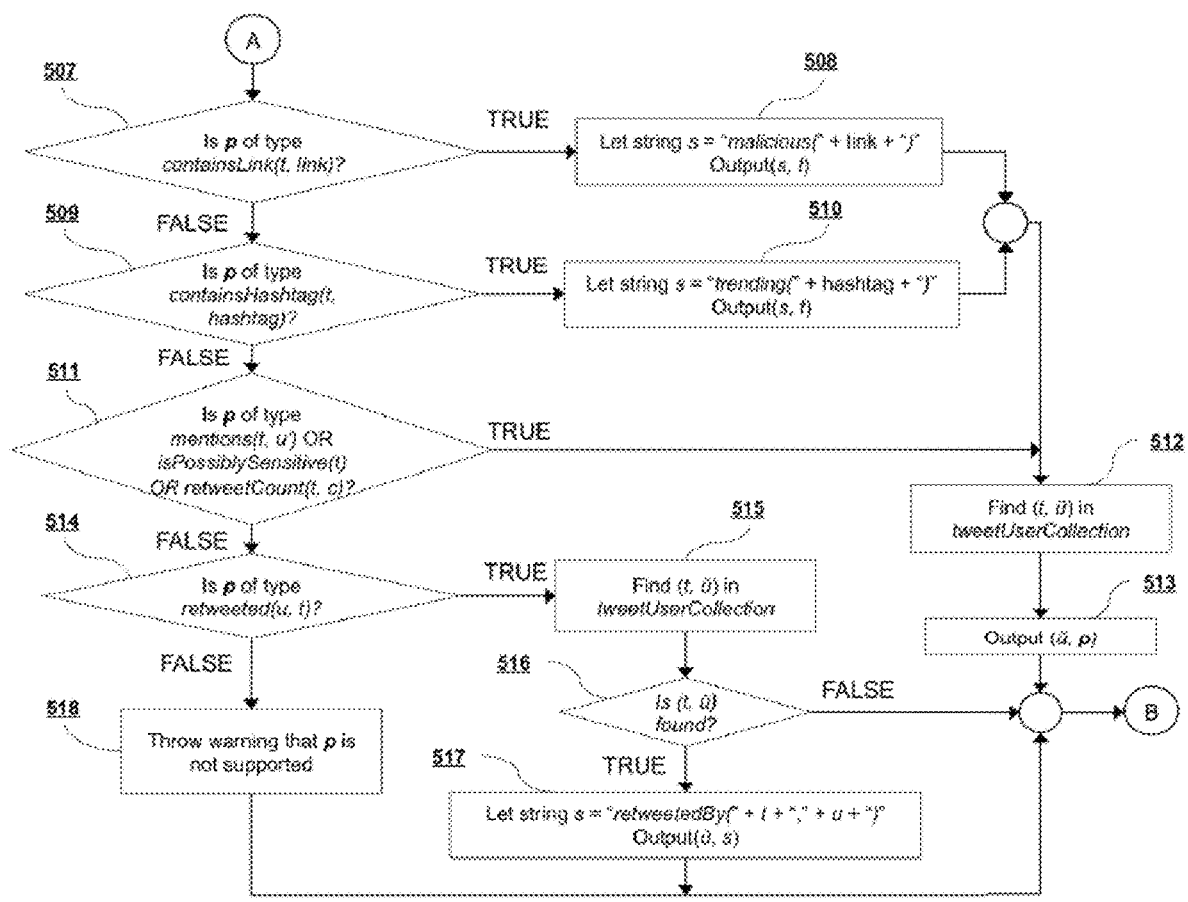

FIGS. 5A and 5B illustrate the steps performed by a subroutine MapPredicates 500, which was invoked and performed at step 405 in FIG. 4. First, a determination is made as to whether all of the ground predicates are processed 501. If true, return back from the subroutine. Otherwise, the following steps are taken: Let p denote the next ground predicate to process 502. Check if p is of type tweeted(.), verified(.), attacker(.), friend(.), friendsCount(.), followersCount(.), statusesCount(.), or favouritesCount(.) 503. Let u denote a userID in the ground predicate p. If true, then output a key-value pair with u as the key 504. Otherwise, check if p is of type malicious(.) or trending(.) 505. If true, then output a key-value pair with p as the key and the string "EXISTS" as the value 506. This is done to indicate that malicious(.) (in the illustrated example, a malicious link) or trending(.) (in the illustrated example, a trending hashtag) exists and should be treated specially later. Otherwise, check if p is of type containsLink(.) 507. If true, then output a key-value pair with a key of type malicious(.) 508, thereby indicating a malicious link. Otherwise, check if p is of type containsHashtag(.) 509. If true, then output a key-value pair with a key of type trending(.), thereby indicating a trending hashtag at 510. Otherwise, check if p is of type mentions(.), isPossiblySensitive(.), or retweetCount(.) 511. If true, find the userID u for the tweetID t in tweetUserCollection 512. Then, output a key-value pair, indicating a user u and a predicate p, with u as the key at 513. Otherwise, check if p is of type retweeted(.) 514. If true, find the userID u for the tweetID t in tweetUserCollection 515 and check if found 516. If so, output a key-value pair with u as the key and a predicate of type retweetedBy(.) as the value 517. (Note that retweetedBy(.) reverses the order of variables in retweeted(.).) A warning is output if p is not recognized 518. When all of the ground predicates have been processed by the subroutine 501, it returns.

Figure 6:
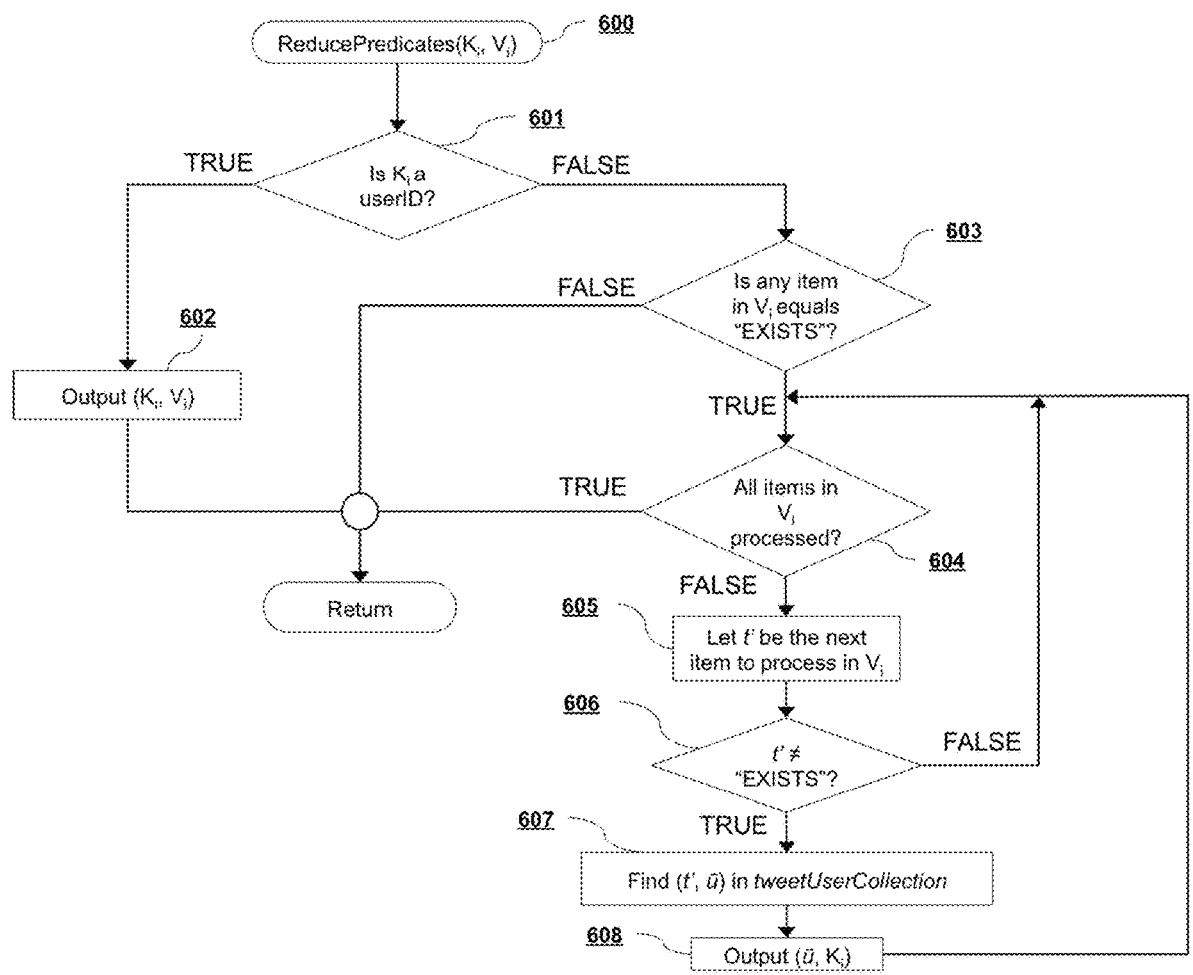
FIG. 6 is a flowchart illustrating a reduction operation according to the invention illustrated in FIG. 1.

FIG. 6 illustrates the steps performed by the subroutine ReducePredicates 600, which was invoked and performed at step 406 in FIG. 4. The subroutine checks if the first argument $K_i$ is a userID 601. If true, the arguments ($K_i, V_i$) are output the way they are 602. Otherwise, the second argument $V_i$, which is a list of items, is tested for the following condition 603: Is there any item in $V_i$ that matches "EXISTS"? If false, then the subroutine returns. Otherwise, $V_i$ is processed further. The subroutine proceeds to check if all items in $V_i$ have been processed at 604. If false, let t' denote the next item to process in $V_i$ 605. If t' is not equal to "EXISTS" 606, then it is a tweetID, and the corresponding userID $\bar{u}$ is obtained from tweetUserCollection 607. A pair ($\bar{u}$, Ki) is output 608. If all items in $V_i$ have been processed 604, the subroutine returns.

Figure 7:
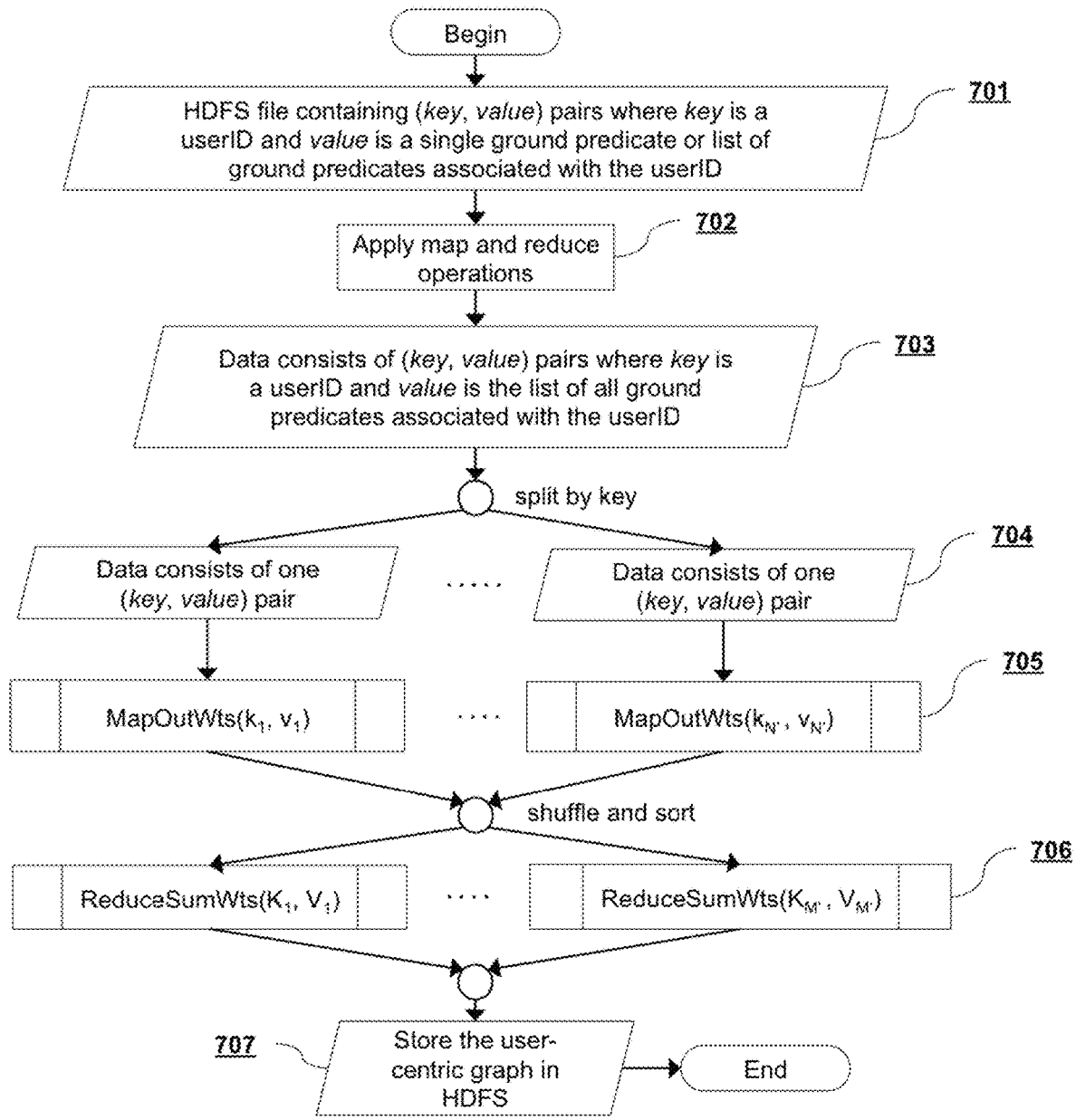
FIG. 7 is a flowchart illustrating the construction of a user-centric graph in parallel according to the invention illustrated in FIG. 1.

FIG. 7 illustrates the next steps to construct the user-centric graph. The input HDFS file 701 is a set of (key, value) pairs, where the key denotes a userID and the value is a single ground predicate (e.g., malicious(http://a.com), trending(# sports)) or a list of ground predicates associated with the userID. By applying map and reduce operations 702, the input data is regrouped by userID to produce the output data 703 in the form of (key, value) pairs, where the key is a userID and value is the list of all ground predicates associated with the userID. Next, the generated data 703 is split by key (i.e., userID) into individual (key, value) pairs 704, and each (key, value) pair is operated by a map operation (i.e., MapOutWts) in parallel 705. The output from all the map operations are shuffled and sorted as in MapReduce. Reduce operations (i.e., ReduceSumWts) are executed in parallel 706 to produce the user-centric graph, which is stored in HDFS 707.

Figure 8:
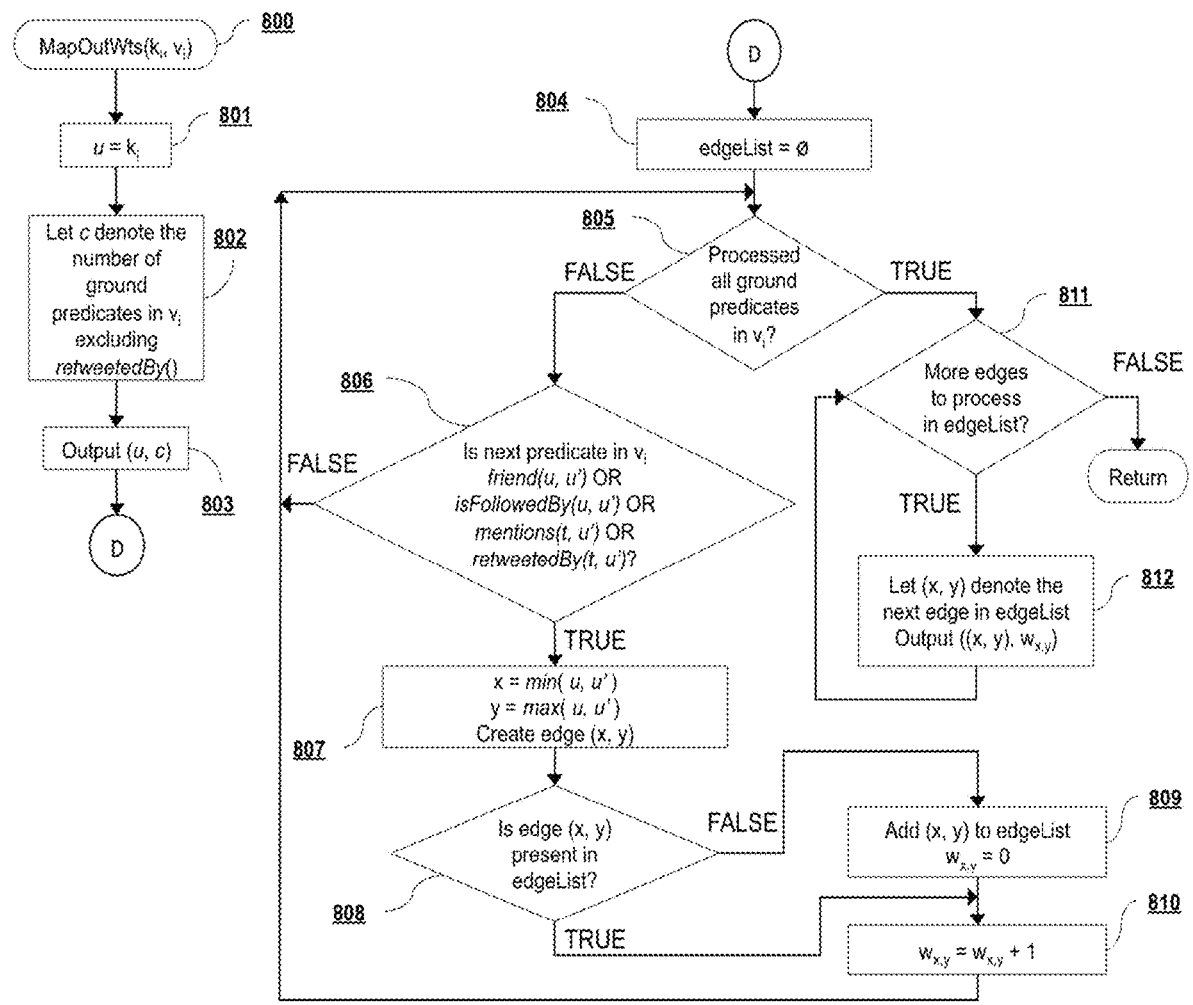
FIG. 8 is a flowchart illustrating a map operation performed during construction of the user centric graph of FIG. 7 according to the invention illustrated in FIG. 1.

FIG. 8 illustrates the steps performed by the map operation denoted by the subroutine MapOutWts 800, which was invoked and performed at step 705 in FIG. 7. The key, which is a userID and the first argument of the subroutine, is stored in variable u 801. The number of ground predicates excluding predicates of the type retweetedBy(.) in the value, which is the second argument of the subroutine, is computed and stored in the variable c 802. The pair (u, c) is output 803 and denotes a weighted vertex of the user-centric graph. The next task is to output weighted edges associated with u. The variable edgeList is initialized to Ø 804. Next, a determination as to whether all ground predicates in the value have been processed 805 is made. If false, the next ground predicate is processed and if it is of type friend(.), isFollowedBy(.), mentions(.), or retweetedBy(.) 806, then an edge (x, y) is created between the two vertices where one of them is u 807.

The presence of the aforementioned predicates is an indication of social relationship between u and another user. Determine if edge (x, y) is already present in edgeList 808. If true, then its weight $w_{x,y}$ is incremented by 1 810. Otherwise, (x, y) is first added to edgeList and $w_{x,y}$ is initialized to 0 809. After that $w_{x,y}$ is incremented by 1 810. When all of the ground predicates in the value have been processed 805, edgeList is further processed to generate weighted edges. Next, determine if there are more edges in edgeList to process 811. If true, then output the edge (x, y) and its weight $w_{x,y}$ 812. Otherwise, return from the subroutine.

Figure 9:
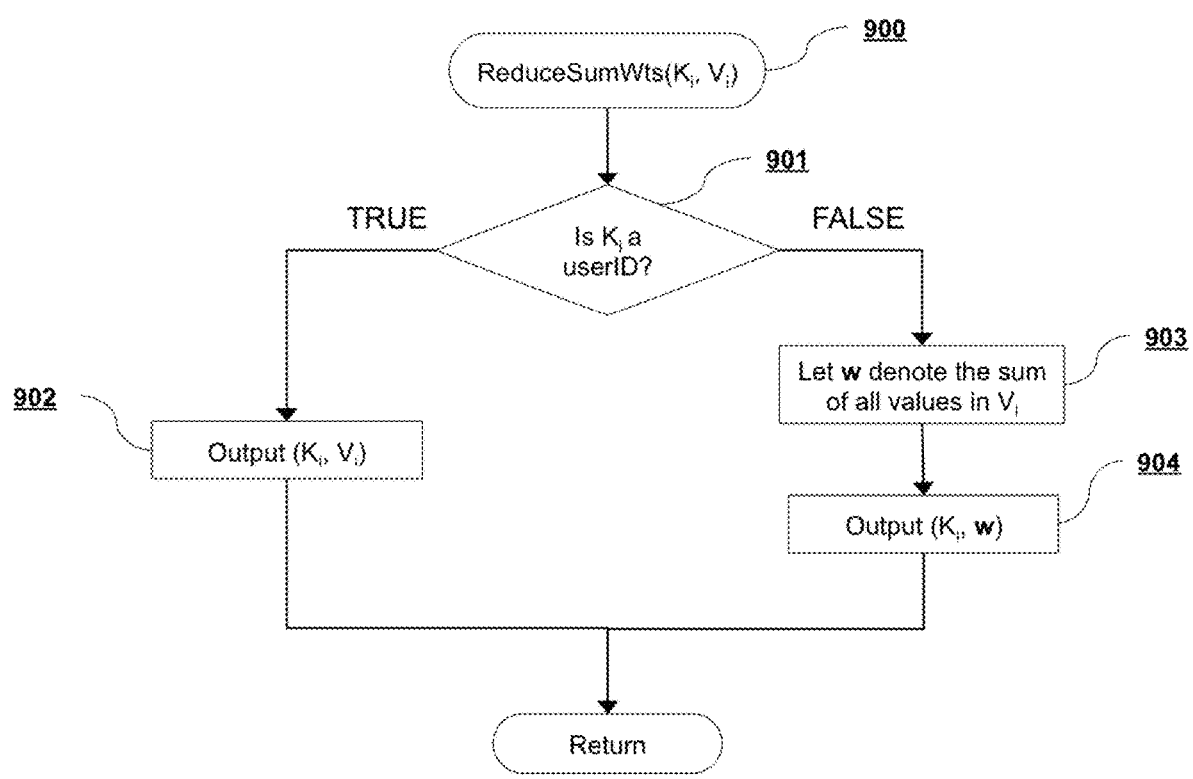
FIG. 9 is a flowchart illustrating a reduction operation performed during construction of the user centric graph of FIG. 7 according to the invention illustrated in FIG. 1.

FIG. 9 illustrates the invention's next course of action after all of the map operations are completed, to commence performance of the subroutine ReduceSumWts at item 900, which was invoked and performed at step 706 in FIG. 7. This involves shuffling the output data and sorting it as in MapReduce. An edge (x, y) may be repeated more than once in the sorted data. In such a case, all the weights associated with (x, y) must be added to produce a single weighted edge. This is accomplished by invoking the reduce operation denoted by the subroutine ReduceSumWts 900. Next, the system determines whether the first argument of the subroutine is a userID 901. If true, the system outputs the arguments to the subroutine as they are 902. Otherwise, the system adds up all of the weights in the second argument, which is the total weight of the edge 903. Then the system outputs the first argument and total weight as the weighted edge 904. Once all the reduce operations have completed, the user-centric graph is stored in HDFS, illustrated as item 102 in FIG. 1.

Figure 10:
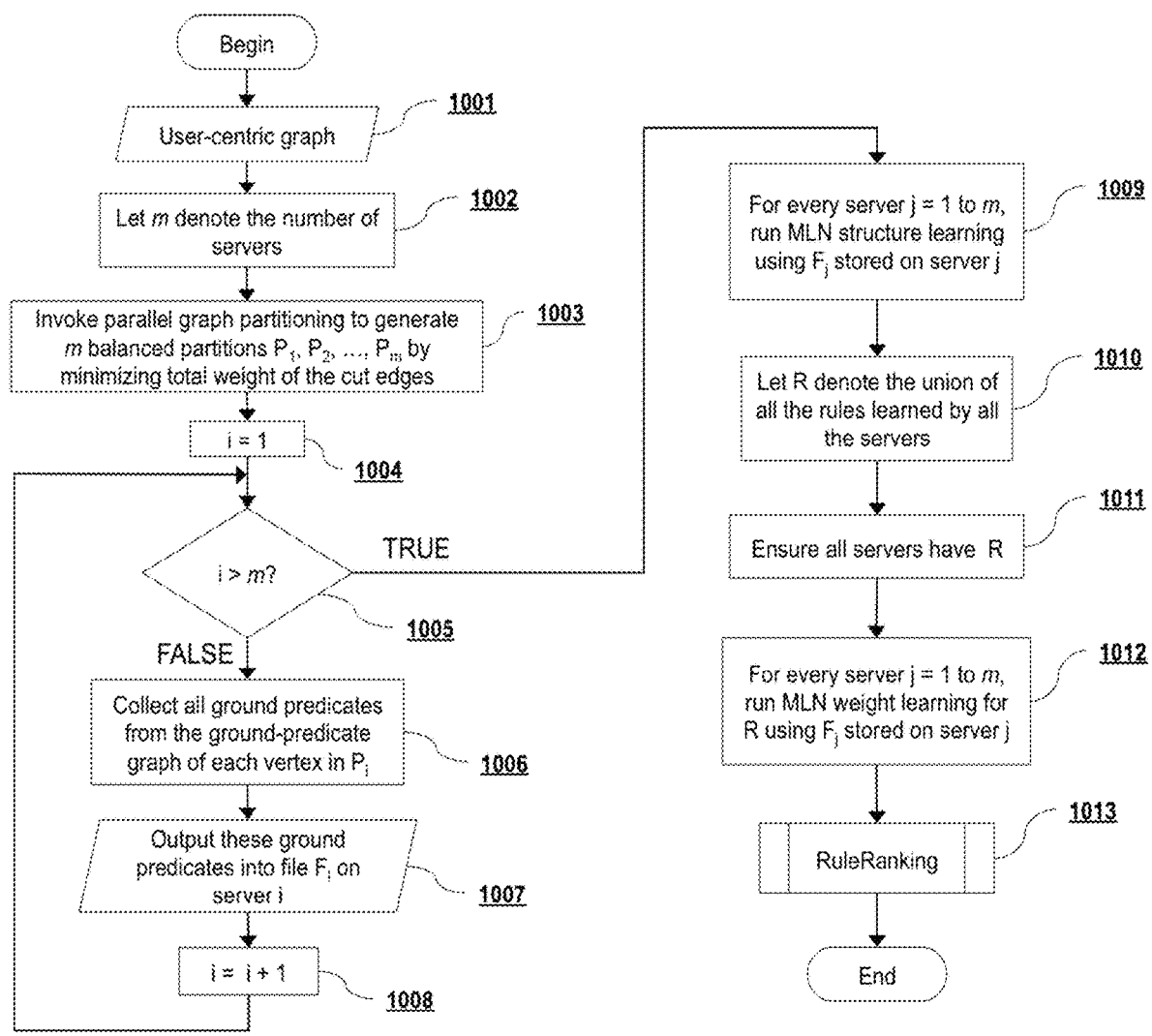
FIG. 10 is a flowchart illustrating user-centric graph partitioning and subsequent use according to the invention illustrated in FIG. 1.

FIG. 10 illustrates the continued processing of the user-centric graph after construction. Here, the user-centric graph is read as input 1001. This user-centric graph needs to be partitioned using graph partitioning methods, which have been well-studied in the literature. Several parallel methods are available for partitioning a graph into some number of balanced partitions while minimizing the total weight of the cut edges (e.g., ParMETIS, ParHIP). Given m servers 1002, this graph is partitioned (using an existing method) to create m balanced partitions (according to vertex weights) by minimizing the total weight of the cut edges 1003. Exemplary methods for partitioning are disclosed in K. Schloegel, G. Karypis, and V. Kumar, Parallel Static and Dynamic Multi-Constraint Graph Partitioning, Concurrency and Computation: Practice and Experience, 14(3):219-240, 2002 the contents of which are hereby incorporated by reference in their entirety; and H. Meyerhenke, P. Sanders, and C. Schulz, Parallel Graph Partitioning for Complex Networks, IEEE Transactions on Parallel and Distributed Systems (TPDS), Jan. 26, 2015, the contents of which are hereby incorporated by reference in their entirety. By balanced, we mean the total vertex weight of each partition is nearly equal across all partitions. The variable i is initialized to 1 at step 1004. The system determines whether the condition i>m at 1005. If false, the system collects all of the ground predicates in the ground-predicate graph of each vertex in partition $P_i$ at 1006. Then, the system stores these predicates into a file $F_i$ on server i 1007. Increment i by 1 1008. If the condition i>m 1005 is true, then the system proceeds to process the individual files $F_1$ through $F_m$. For every server j, the system runs an existing MLN-structure-learning method on $F_j$ on server j at 1009. One example of a suitable MLN structure learning method for use at step 1009 is disclosed in S. Kok and P. M. Domingos, Learning Markov Logic Networks Using Structural Motifs, Proceedings of the 27th International Conference on Machine Learning (ICML), pages 551-558, Haifa, Israel, 2010, the contents of which are hereby incorporated by reference in their entirety. This method identifies structural motifs in the data and constrains the rules to be within these motifs thereby speeding up rule learning.

Step 1009 results in an output of automatically generated first order logic rules that serve to predict malicious content and suspicious users on Twitter® or other social media. For example, FIG. 14 illustrates a set of first-order formulas 1401, 1402 resulting from step 1009.

All of the rules learned on all servers are combined by applying the union operation to produce Rat 1010, which is provided to all servers 1011. On each server j, run MLN weight learning on R using Fj 1012.

Step 1012 results in an output of automatically generated weights for the first-order logic rules output in step 1009. For example, FIG. 15 illustrates a set of output data detailing exemplary weights 1501, 1502 for first-order formulas resulting from step 1009. The learned weights reflect how likely the formulas are to be satisfied/unsatisfied in a set of possible worlds. Accordingly, with a weight of 3.5, formula 1501 is likely to be satisfied. Conversely, with a weight of −2.5, formula 1502 is not likely to be satisfied, albeit with less certainty than formula 1501 is predicted to be satisfied (i.e., the absolute value of the weight for formula 1501 is greater than that determined for formula 1502).

Finally, the subroutine RuleRanking 1013 is used to select the most relevant rules in the KB.

Figure 11:
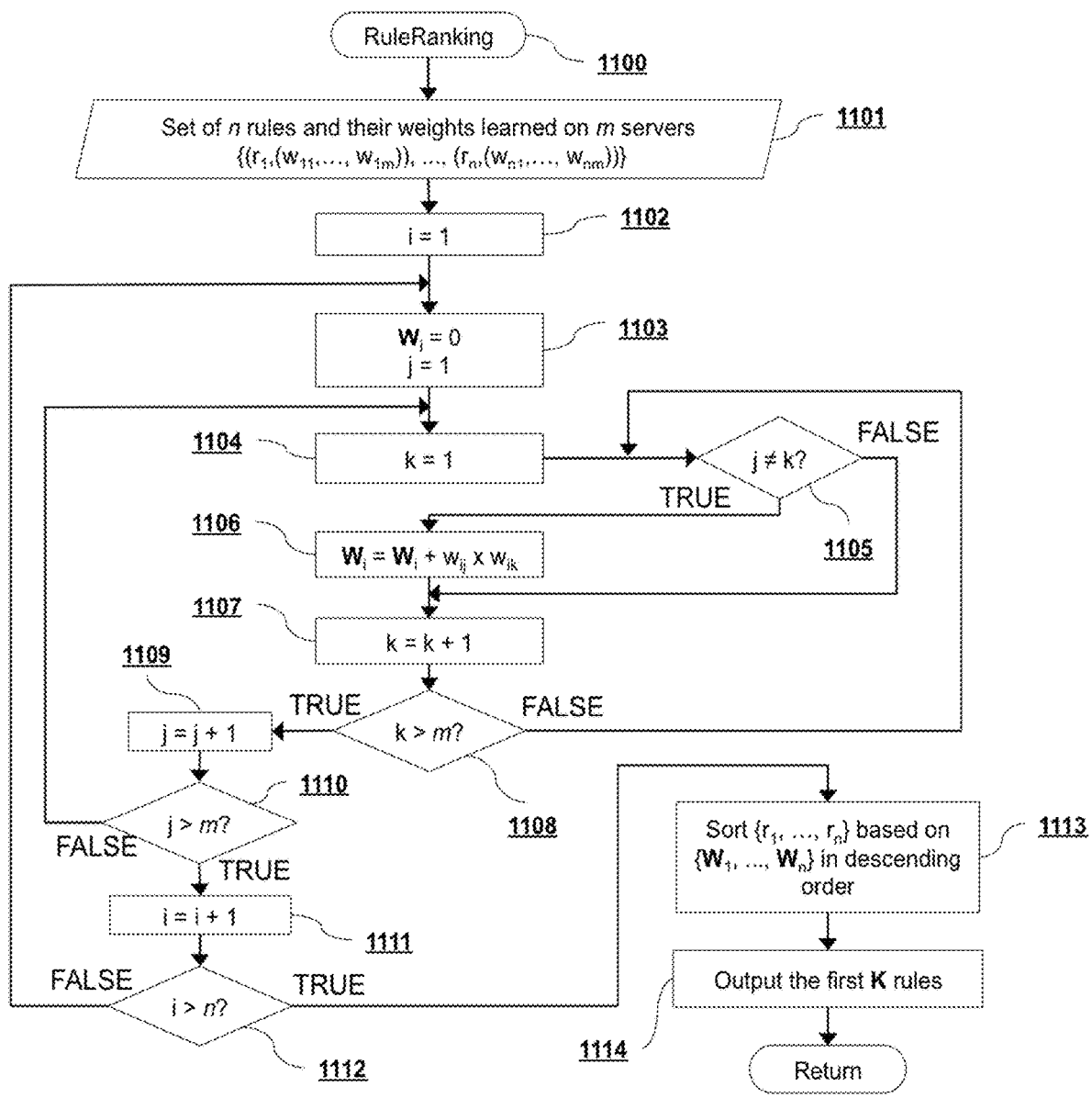
FIG. 11 is a flowchart illustrating a combination and sorting of learned rule weights on different servers according to the invention illustrated in FIG. 1.

FIG. 11 illustrates the steps performed by the subroutine RuleRanking 1100 used to combine learned rules' weights on different servers/partitions and illustrates the ranking of these rules based on relevance. The first step is to compute for each rule, the product of the weights of the rule between every pair of partitions/servers. Then these partial products are summed to get a total weight. As the weight of a rule on a partition can be positive, negative, or zero, the different weights are objectively combined. Because the weights of a rule on two partitions are multiplied, when the signs differ for the weights, i.e., a rule is more likely to be satisfied in one partition/server and is more likely to be unsatisfied in another, the method penalizes such a rule. The total weight is used to rank the rules such that higher total weight equates to more relevancy of the rule.

The input to the subroutine is a set of n rules $\{r_1, \ldots r_n\}$, and each rule $r_i$ has weights learned on m servers $\{w_{i1}, \ldots, w_{im}\}$ 1101. Starting with the first rule where i equals 1 1102, for each rule $r_i$, the method initializes the total weight $W_i$ for rule $r_i$ to zero and j to 1 1103. The variable k is initialized to 1 1104. A determination is made as to whether the condition j≠k holds 1105. If true, then add $w_{ij} \times w_{ik}$ to $W_i$ 1106. Increment k by 1 1107. Determine whether k is greater than m 1108. If false, go back to checking the condition j≠k 1105. Otherwise, increment j by 1 1109. Determine if j is greater than m 1110. If false, reinitialize k 1104. Otherwise, consider the next rule by incrementing i by 1 1111. Check if there are any more rules to process 1112. If there are still rules to process, then go back to reinitializing $W_i$ and j 1103. If all rules have been processed, then sort the rules in descending order by total weight $W_i$ 1113 and output the first K rules 1114.

Figure 12:
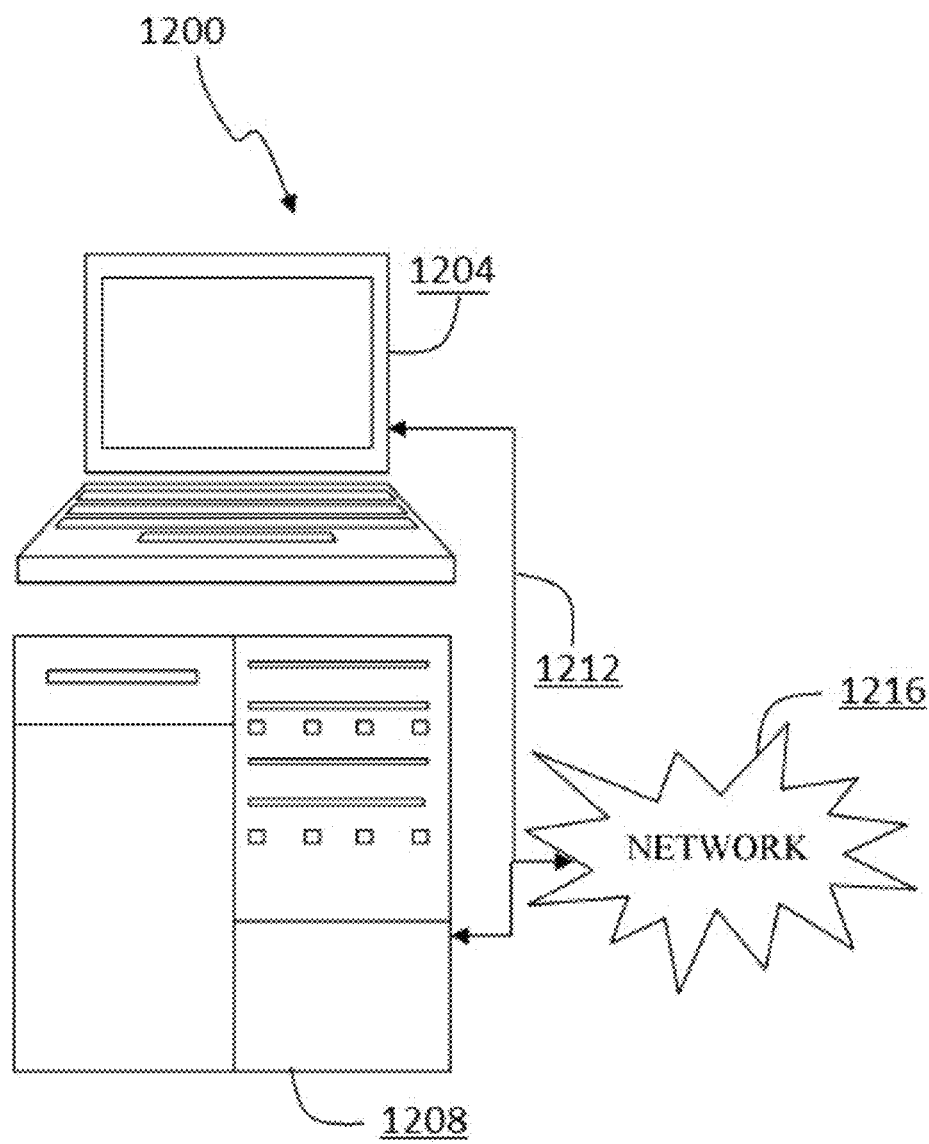
FIG. 12 is a schematic diagram of an exemplary computerized system according to an embodiment of the present invention.

The present invention may be carried out in a single or a plurality of computerized systems working in tandem. An illustrative example is shown in FIG. 12 and generally indicated as 1200. Computerized system 1200 that is shown in FIG. 12 may be considered to represent any type of computer, computer system, computing system, server, disk array, or programmable device such as multi-user computers, single-user computers, handheld devices, networked devices, or embedded devices, etc. For example, and without limitation, computerized system 1200 is illustrated in FIG. 12 as comprising server, indicated as 1208, and a personal computer, indicated generally as 1204, which may be connected, as indicated by 1212, through a network, indicated generally 1216, to form a networked computer system using one or more networks (e.g., in a cluster or other distributed computing system through a network interface).

Figure 13:
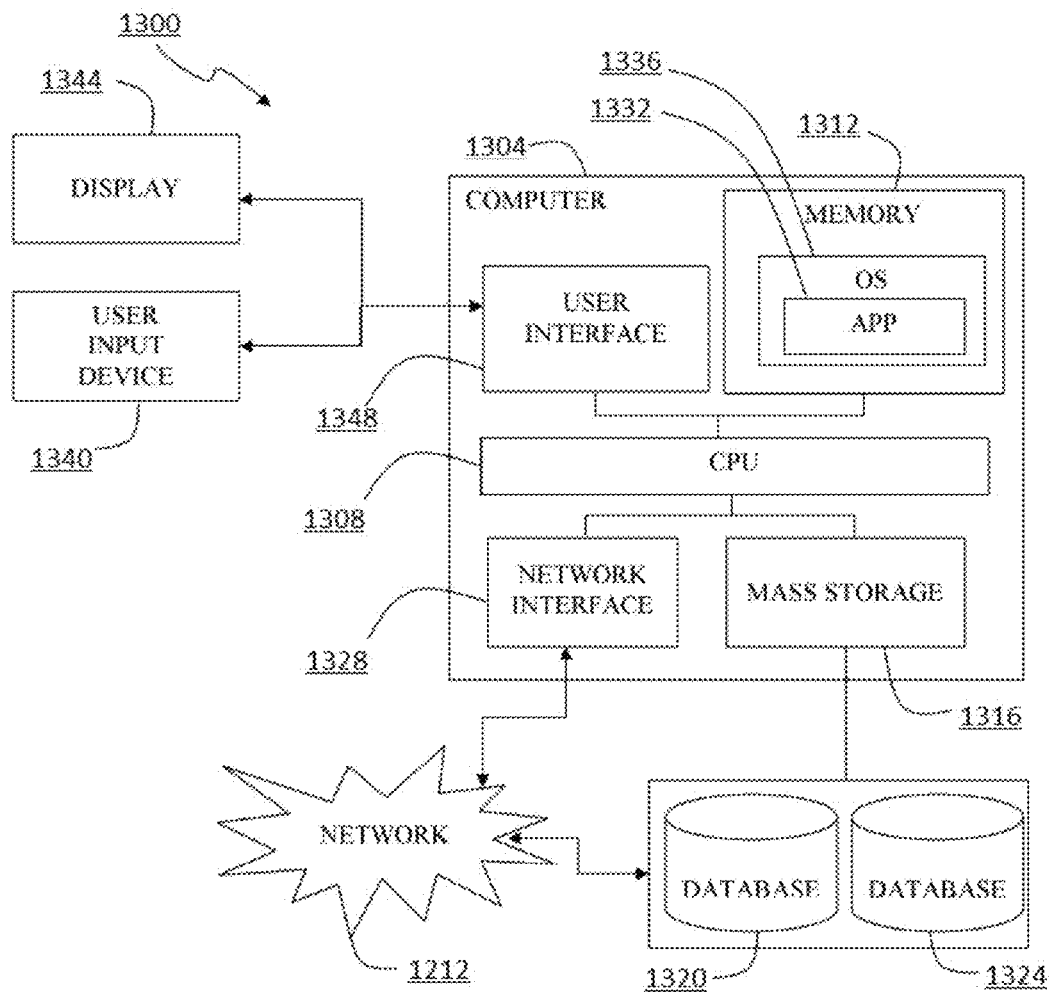
FIG. 13 is a schematic diagram of exemplary components of the computerized system of FIG. 12.

For example, and without limitation, computerized system 1200 is represented schematically in FIG. 13 and is generally indicated as 1300 that has a single computer, indicated as 1304, although it should be appreciated that computerized system 1300 may also include multiple suitable programmable electronic devices. Computer 1304 typically may include at least one processing unit (illustrated as "CPU" 1308) coupled to Memory 1312 along with several different types of peripheral devices (e.g., a Mass Storage Device 1316 with one or more Databases 1320 and 1324, an input/output interface 1340, 1344, and a Network Interface (I/F) 1328. Memory 1312 may include (not shown) dynamic random access memory ("DRAM"), static random access memory ("SRAM"), non-volatile random access memory ("NVRAM"), persistent memory, flash memory, at least one hard disk drive, and/or another digital storage medium. Mass storage device 1316 is typically at least one hard disk drive and may be located externally to Computer 1304, such as in a separate enclosure or in one or more networked computers, one or more networked storage devices (including, for example, a tape or optical drive), and/or one or more other networked devices (including, for example, a server).

CPU 1308 may be, in various embodiments, a single-thread, multi-threaded, multi-core, and/or multi-element processing unit (not shown) as is known in the art. In alternative embodiments, Computer 1304 may include a plurality of processing units that may include single-thread processing units, multi-threaded processing units, multi-core processing units, multi-element processing units, and/or combinations thereof as is known in the art. Similarly, Memory 1312 may include one or more levels of data, instruction, and/or combination caches, with caches serving the individual processing unit or multiple processing units (not shown) as is well known in the art.

Memory 1312 of Computer 1304 may include one or more applications (indicated schematically as "APP" 1332), or other software program, which are configured to execute in combination with the Operating System (indicated schematically as "OS" 1336) and automatically perform tasks necessary for processing and analyzing sequences with or without accessing further information or data from the Database(s) 6 of the mass storage device.

A user may interact with Computer 1304 via a User Input Device 1340 (such as a keyboard or mouse) and a Display 1344 (such as a digital display) by way of a User Interface 1348.

Those skilled in the art will recognize that the computerized system 1200 and computer system 1300 illustrated in FIGS. 12 and 13, respectively, are exemplary and may be in other configurations, may include other components. Indeed, those skilled in the art will recognize that other alternative hardware and/or software environments may be used in computerized system 1200 and computer system 1300.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. A cyberthreat detection system comprising a distributed file system and a commodity cluster configured in data communication via a network, wherein the commodity cluster is defined as a plurality m of servers, each including a computer processor and a nontransitory computer-readable storage medium comprising a plurality of instructions which, when executed by the computer processor, performs the method comprising:

receiving a data array characterized by a key and a value in a set of pairs relating to social media posts and users;

storing a plurality of predetermined ground predicates;

constructing a ground predicate graph for each user reflected in the array;

constructing a user centric graph having one or more vertices and one or more edges and wherein each vertex represents the ground predicate graph corresponding to each user;

partitioning the user centric graph into balanced portions $P_i$ corresponding to the number of servers and wherein the ground predicates of each vertex in partition $P_i$ are stored as a file on a server associated with that partition $P_i$;

determining a plurality of learned rules, in parallel on each server, on the files stored on each server;

receiving a union of the plurality of learned rules;

determining a respective weight for each of the plurality of learned rules of the union; and ranking the plurality of rules of the union by the plurality of weights.

2. The system according to claim 1 wherein variables in the predetermined ground predicates comprise one or more of the following types (i) "tweetID" to denote the ID of a tweet (ii) "user ID" to denote the ID of a user (iii) "link" to denote a URL (iv) "hashtag" to denote a word prefixed by the '#' symbol and (v) "count" to denote a non-negative integer.

3. The system of claim 1, wherein the data array is split into separate data blocks and wherein constructing the user centric graph comprises:

performing a map operation in parallel on each block;

shuffling and sorting the data output from the map operations;

performing a reduce operation in parallel for each block of data shuffled and sorted; and storing the data output from the reduce operation in a file.

4. The system of claim 3, wherein the file is a Hadoop Distributed File System file.

5. The system of claim 3, wherein constructing the user centric graph comprises:

splitting the data into key-value pairs;

performing a second map operation in parallel in order to output weights;

shuffling and sorting the output weights from the second map operation;

performing a second reduce operation in parallel on the output weights to produce the user centric graph; and storing the user centric graph in the file.

6. The system of claim 5, wherein the file is a Hadoop Distributed File System file.

7. The system of claim 5, wherein an edge is defined between a first and a second user in the user centric graph if any of the following conditions are satisfied: a tweet of the first user mentions the second user; a tweet of the second user mentions the first user; the first user is a friend of the second user; the second user is a friend of the first user; the first user is followed by the second user; the second user is followed by the first user; a tweet of the first user was retweeted by the second user; or a tweet of the second user was retweeted by the first user.

8. The system according to claim 1 wherein ranking the plurality of rules of the union comprises:
   determining a respective partial product of the weights for each of the plurality of learned rules of the union; and
   summing the plurality of partial products to define a total weight.

9. A computer-implemented method of cyberthreat detection, the method comprising:
   receiving, using each of a plurality m of servers, a plurality of first-order predicates;
   receiving, using a distributed file system, a plurality of ground predicates associated with the first-order predicates and each characterized by a key and a value;
   receiving a data array characterized by a key and a value in a set of pairs relating to social media posts and users;
   storing the plurality of ground predicates;
   constructing a ground predicate graph for each user reflected in the array;
   constructing a user centric graph having one or more vertices and one or more edges and wherein each vertex represents the ground predicate graph corresponding to each user;
   partitioning the user centric graph into balanced portions $P_i$ corresponding to the number of servers and wherein the ground predicates of each vertex in partition $P_i$ are stored as a file on a server associated with that partition $P_i$;
   determining a plurality of learned rules, in parallel on each server, on the files stored on each server;
   receiving a union of the plurality of learned rules;
   determining a respective weight for each of the plurality of learned rules of the union; and
   ranking the plurality of rules of the union by the plurality of weights.

10. The method according to claim 9 wherein variables in the ground predicates comprise one or more of the following types (i) "tweetID" to denote the ID of a tweet (ii) "userID" to denote the ID of a user (iii) "link" to denote a URL (iv) "hashtag" to denote a word prefixed by the '#' symbol and (v) "count" to denote a non-negative integer.

11. The method of claim 9, wherein the data array is split into separate data blocks and wherein constructing the user centric graph comprises:
   performing a map operation in parallel on each block;
   shuffling and sorting the data output from the map operations;
   performing a reduce operation in parallel for each block of data shuffled and sorted; and
   storing the data output from the reduce operation in a file.

12. The method of claim 11, wherein the file is a Hadoop Distributed File System file.

13. The method of claim 11, wherein constructing the user centric graph splitting the data into key-value pairs;
   performing a second map operation in parallel in order to output weights;
   shuffling and sorting the output weights from the second map operation;
   performing a second reduce operation in parallel on the output weights to produce the user centric graph; and
   storing the user centric graph in the file.

14. The method of claim 13, wherein the file is a Hadoop Distributed File System file.

15. The method of claim 9, wherein an edge is defined between a first and a second user in the user centric graph if any of the following conditions are satisfied: a tweet of the first user mentions the second user; a tweet of the second user mentions the first user; the first user is a friend of the second user; the second user is a friend of the first user; the first user is followed by the second user; the second user is followed by the first user; a tweet of the first user was retweeted by the second user; or a tweet of the second user was retweeted by the first user.

16. The method according to claim 9 wherein ranking the plurality of rules of the union comprises:
   determining a respective partial product of the weights for each of the plurality of learned rules of the union; and
   summing the plurality of partial products to define a total weight.

17. A system for detecting suspicious activity on social media comprising:
   a distributed file system and a commodity cluster configured in data communication via a network, wherein the commodity cluster is defined as a plurality m of servers, each server including a computer processor and a non-transitory computer-readable storage medium;
   a data array characterized by a key and a value in a set of pairs relating to social media posts and users;
   wherein the processor is configured to store a plurality of predetermined ground predicates;
   wherein the processor is configured to construct a ground predicate graph for each user reflected in the array;
   wherein the processor is configured to construct a user centric graph having one or more vertices and one or more edges and wherein each vertex represents the ground predicate graph corresponding to each user;
   wherein the processor is configured to partition the user centric graph into balanced portions $P_i$ corresponding to the number of servers and store the ground predicates of each vertex in partition $P_i$ as a file on a server associated with that partition $P_i$;
   wherein the processor is configured to determine a plurality of learned rules, in parallel on each server, on the files stored on each server;
   wherein the processor is configured to perform a union operation to generate a union of the plurality of learned rules; and
   wherein the processor is configured to determine a respective weight for each of the plurality of learned rules of the union; and
   wherein the processor is configured to rank the plurality of rules of the union by the plurality of weights.

18. The system according to claim 17 wherein the processor is configured to determine the plurality of learned rules by running a Markov logic network learning algorithm.

19. The system of claim 17, wherein an edge is defined between a first and a second user in the user centric graph if any of the following conditions are satisfied: a tweet of the first user mentions the second user; a tweet of the second user mentions the first user; the first user is a friend of the second user; the second user is a friend of the first user; the first user is followed by the second user; the second user is followed by the first user; a tweet of the first user was retweeted by the second user; or a tweet of the second user was retweeted by the first user.

20. The system according to claim 17 wherein the processor is configured to ranking the plurality of rules of the union by determining a respective partial product of the weights for each of the plurality of learned rules of the union and summing the plurality of partial products to define a total weight.

\* \* \* \* \*